United States Patent [19]
Holt

[11] 3,938,650
[45] Feb. 17, 1976

[54] INDEXING ARTICLE SEPARATING AND FEEDING CONVEYOR
[75] Inventor: Ronald Holt, Battle Creek, Mich.
[73] Assignee: Franklin Electric Subsidiaries, Inc., Bluffton, Ind.
[22] Filed: Feb. 27, 1975
[21] Appl. No.: 553,475

[52] U.S. Cl. .................... 198/76; 198/34; 198/135; 198/165
[51] Int. Cl.² ................... B65G 37/00; B65G 15/16
[58] Field of Search ......... 198/21, 34, 76, 135, 162, 198/164, 165, 37

[56] References Cited
UNITED STATES PATENTS

| | | | |
|---|---|---|---|
| 3,178,007 | 4/1965 | Standley et al. | 198/34 |
| 3,194,382 | 7/1965 | Nigrelli et al. | 198/34 |
| 3,482,674 | 12/1969 | Wiseman | 198/164 X |
| 3,794,154 | 2/1974 | Holt | 198/34 |
| 3,823,813 | 7/1974 | Holt | 198/76 |

Primary Examiner—Evon C. Blunk
Assistant Examiner—Richard K. Thomson
Attorney, Agent, or Firm—Austin A. Webb

[57] ABSTRACT

Articles delivered in side-by-side rows are separated in each row and advanced in pairs to the feeding flights of a wrapping machine conveyor operating at right angles across the ends of the delivery rows, by pairs of accelerating belts that grip the lead pair of articles in the rows between top and bottom belts and advance the pair at a faster rate than the delivery conveyors. Separator bars extending transversely across the paths of the articles are advanced in an orbit around the top accelerating belts and above the bottom accelerating belts by carrier loops located vertically alongside of the accelerator belts. The accelerator belts and the carrier loops are driven intermittently in a cycle synchronized with the feeding flights to advance at higher speed than the article feeding rows during 270° of each cycle and stop during 90° of each cycle with a separator bar in the gap created at the leading end of the delivery rows, to stop a pair of articles at the entrance or "nip" between the accelerating belts.

13 Claims, 3 Drawing Figures

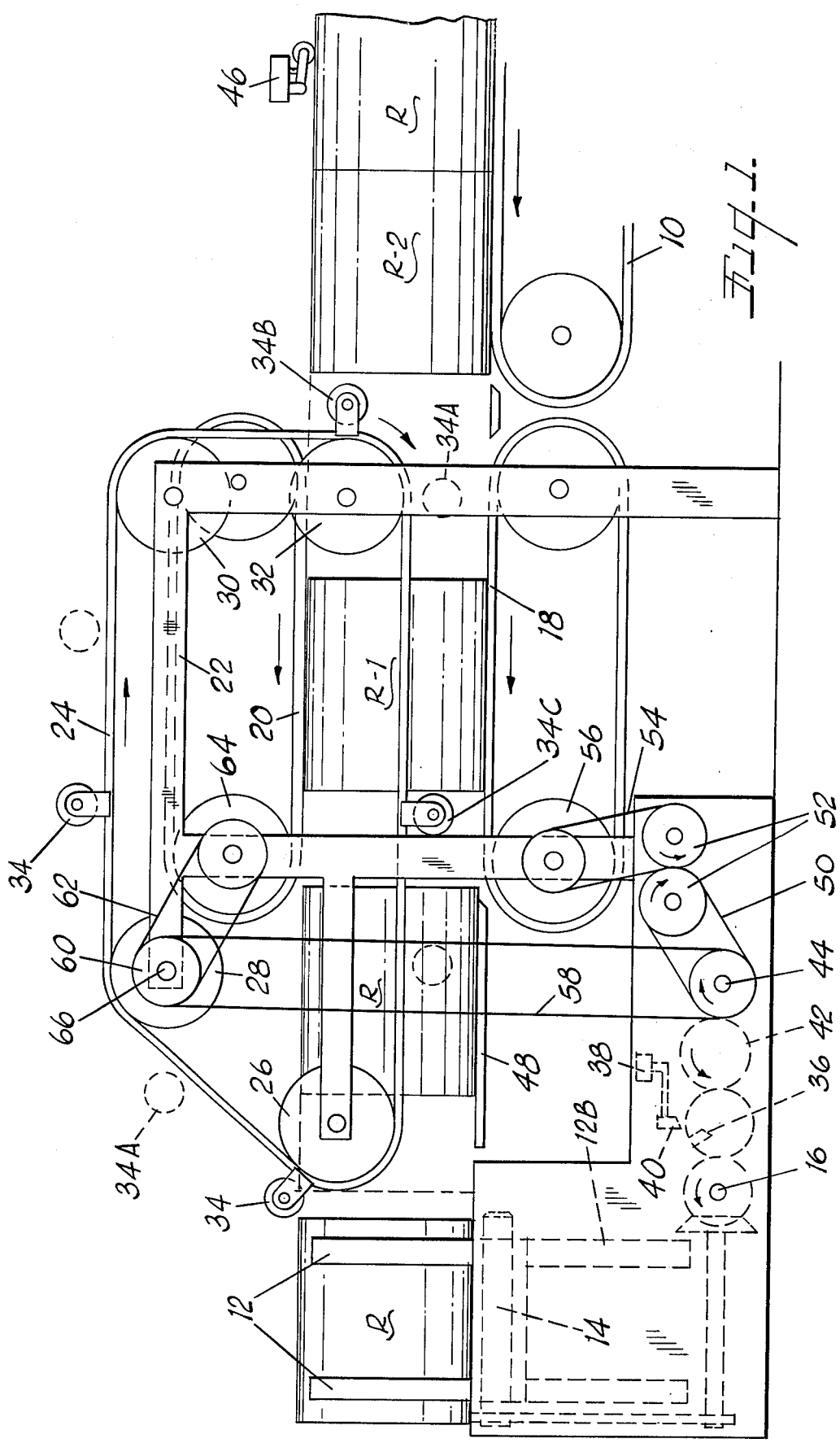

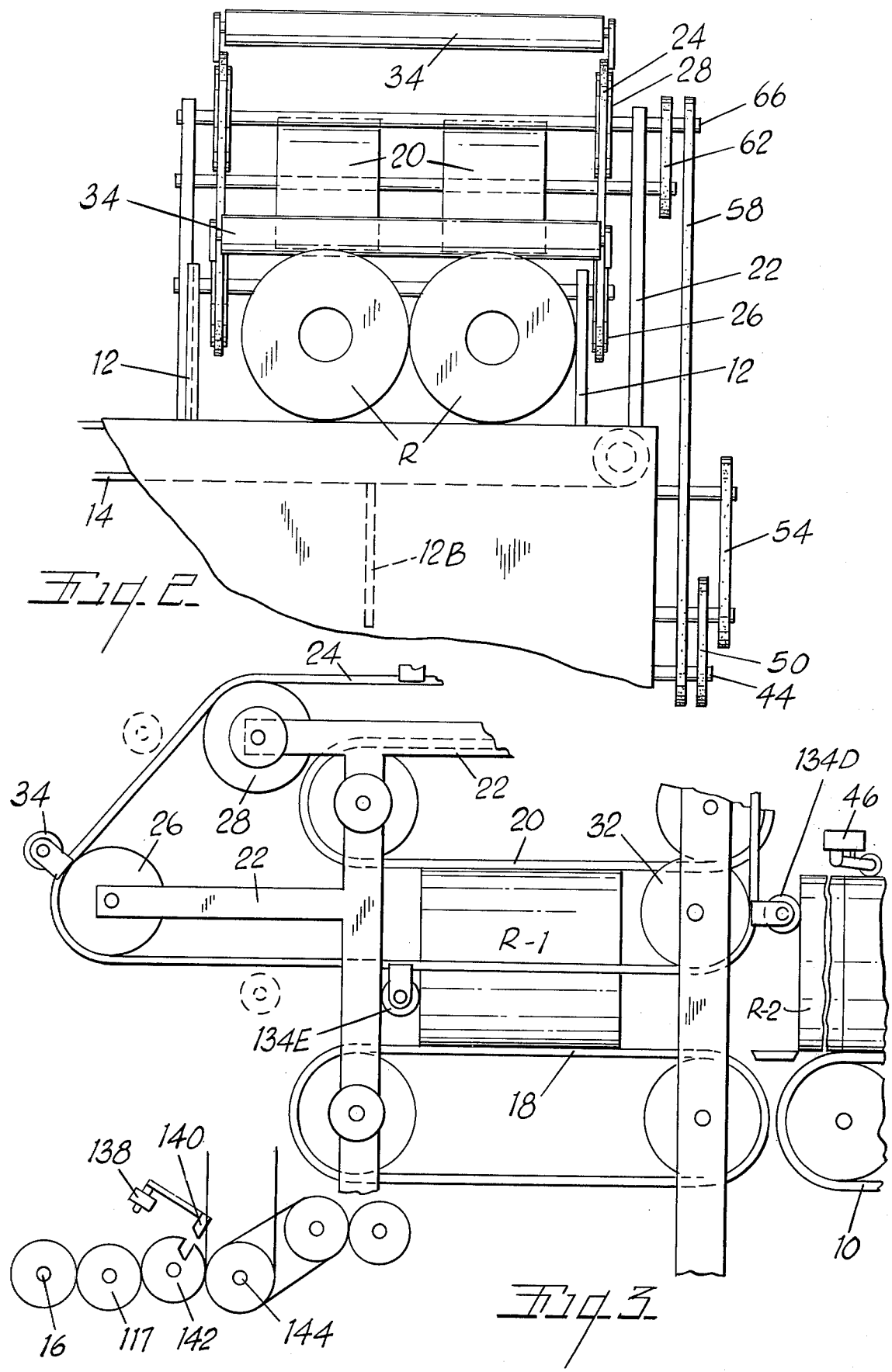

INDEXING ARTICLE SEPARATING AND FEEDING CONVEYOR

OUTLINE OF INVENTION AND RELATED PATENTS

My U.S. Pat. Nos. 3,823,813 and No. 3,794,151 disclose machines for performing a similar operation by means of upper accelerating rolls and belts that advance articles from the ends of supply conveyors. In those patents, the timing of the release of each pair of articles is determined by swinging gates at the ends of the supply conveyors, and orbiting transverse bars enter into the gaps created between articles by the gates to complete the delivery of the articles to the wrapping machine conveyor.

The present invention is an improvement over the foregoing patents, in that the need for timing gates is eliminated. The entry of a pair of articles to the accelerating belts (and the delay of articles on the supply conveyors) is effected by timing the orbiting transverse bars to enter into the gap created by the acceleration of the leading pair of articles and stopping in blocking relation to other articles on the delivery belts. The cycle, from accelerating start to stop and dwell, of the orbiting transverse bars is synchronized with the cycle of the arrival of each flight of article receiving pockets on the wrapping machine conveyor at the end of the accelerating path. The final delivery of each pair of articles is effected solely by movement of the transverse orbiting bars.

DESCRIPTION

The drawings, of which there are two sheets, illustrate a practical and preferred form of the invention, and an alternate variation of the drive to the mechanism.

FIG. 1 is a side elevational view of article receiving, separating accelerating and delivery ends of the conveyors of the invention.

FIG. 2 is an elevational view of the receiving end of the wrapping machine conveyor, in front of the end of the accelerating conveyor.

FIG. 3 is a fragmentary side elevational view showing a modified and alternative drive to the belts and loops of the conveyor.

As in previously, identified patents, articles to be wrapped (in this case rolls of toilet tissue R) are delivered in two parallel rows by side-by-side delivery belts 10 which operate continuously to deliver rolls from a source of manufacture. The belts have smooth surfaces and may slide under rolls that are blocked on their discharge ends as will be described. The spacing if any, of the rolls on the delivery conveyors depends on the source of supply and may vary. The pairs of rolls in side-by-side relation are delivered to the wrapping machine conveyor ahead of the flight bars 12 of the conveyor 14. Shaft 16 of the wrapping machine makes one (or an integral multiple of one) revolution for each cycle of the wrapping machine, so a set of flight bars or fingers of the wrapping conveyor arrives in article receiving position with each cycle of the shaft.

The accelerating, separating and delivery conveyor system between the delivery conveyor 10 and the wrapping machine conveyor 14 consists of a pair of side-by-side lower accelerating belts 18 which receive rolls from the ends of the belts 10 and a pair of opposed top or upper accelerating belts 20 which are spaced to grip and advance the rolls between the upper and lower belts. Suitable supporting frame structure is indicated at 22. Positioned along the sides of the belts 18 and 20 are a pair of belt or chain loops 24 supported by pulleys 26, 28, 30 and 32. The loops carry four transversely extending bars or rollers 34 at equally spaced positions therearound. The full line positions of the bars show them in operating or moving positions near the end of a cycle of operation. The dotted positions 34A indicate stop or dwell positions of the bars as will be described. It will be noted that one bar 34B has moved into the gap between rolls R-1 and R-2 created by the acceleration of roll R-1 over the speed of rolls on the delivery conveyor 10. The bar will come to rest at the dotted position between the inlet ends or at the "nip" between belts 18 and 20. There it blocks the entry of roll R-2 to the accelerating belts until the next cycle of the wrapping machine.

The intermittent drive to the belts 18 and 20, and the belt loops 24 is provided from the wrapping machine shaft 16 by a one position clutch indicated conventionally by the dotted lines at 36. As long as the solenoid 38 is energized, the pawl 40 is retracted and the clutch continues to rotate stopping only at a single position after a complete revolution. The clutch 36 drives a commercially available indexing unit which is indicated generally and conventionally by the dotted gearing at 42. The indexing unit intermittently drives shaft 44 so long as the clutch 36 is engaged. The clutch is controlled by a sensing switch 46 which senses the presence of available rolls R on the delivery conveyor 10. Desirably at least two or three pairs of rolls accumulate at the end of the delivery conveyor ahead of the switch to assure delivery to the accelerating belts at the start of each cycle.

The accelerating belts have working reaches which are about twice as long as the articles R. During each cycle, the belts pick up one pair of articles such as R-1 and advance them onto a dead plate 48. The lower accelerating belt 18 is driven from the shaft 44 by chain or belt 50 to reversing gears 52 and belt 54 to drive rolls 56. The upper accelerating belt 20 is driven directly from shaft 44 by belt or chain 58 to pulley 60, and from there by chain 62 to drive roll 64. Pulley 60 also drives shaft 66 and drive pulleys 28 which drive the belt or chain loops 24. Note that the drive ratios are such that the chain loops 24 and the accelerating belts 20 and 18 operate at the same linear speeds. Note also that the path of travel of each separator bar 34 is somewhat over three times the length of the working reaches of the accelerator belts 18 and 20. The advance of each separator bar during each cycle is more than the length of the working reaches of the accelerator belts.

OPERATION

To complete the operating cycle shown in motion in full lines in FIG. 1, the cross bar 34B will advance to position 34A where it will stop during the 90° dwell period of the intermittent drive 42. This blocks the entry of article R-2 to between the accelerating belts as previously described. The preceeding article R-1 and the cross bar 34C which preceeds it at the same speed will advance until the article R-1 nears the discharge ends of the accelerating belts. During its final motion of the cycle, cross bar 34C will overtake and engage the article R on the dead plate 48 and move the article part way across the dead plate before stopping.

The intermittent drive 42 then enters a dwell period of 90° of the cycle of the wrapping machine and shaft 16 which continue to operate. Desirably, the intermittent drive (and the accelerating belts and the chain loops driven thereby) decelerates before stopping and accelerates relatively slowly when it starts agains. As previously noted, commercial drive trains are available to provide this intermittent drive, so the details of the drive are not illustrated.

As the next cycle of the machine starts, the next set of flight bars 12B of the wrapping machine conveyor will be approaching article receiving position, and the delivery belts or conveyor 10 will have advanced the pair of articles R-2 against cross bar 34A. Cross bar 34C quickly advances the article on the dead plate into the empty pocket on the wrapping machine conveyor, and article R-1 is advanced onto the dead plate. Article R-2 advances to the position of article R-1, and the cycle is complete.

Note that the spacing between the centers of the cross bars 34 on the chain loops 24 is slightly more than twice the length of the articles R; and the length of the working reaches of the accelerating belts 18 and 20 is materially shorter than the spacing between the cross bars 34. The length of the articles may of course be varied. Each cycle and incremetal advance of the cross bars permits accelerated advance of a pair of articles almost but not fully through the accelerating belts. The length of the dead plate 48 (beyond the diverging and article releasing ends of the accelerating belts) is well over the length of the articles R, and the lineal advance of the cross bars 34 to delivery position at the side of the wrapping machine conveyor is slightly greater than the length of the articles during each cycle. Each cross bar accordingly acts first as a blocking element between successive pairs of articles and then as a final feeding or delivery element for the preceding pair of articles. Assuming an adequate rate of supply of articles by conveyors 10, the separating and indexing conveyor functions to admit and guide each pair of articles to the accelerating cycle, while creating a gap between successive pairs of articles, and completing positive and accurately timed delivery of the preceding pair of articles remains stationary only while the cross bars momentarily block entry of articles and during the dwell of the intermittent drive. Note that as each cross bar passes through position 34C it will advance into contact with the preceding pair of articles and stop, while remaining in contact with the leading ends of the succeeding pair of articles. The pairs of articles are thus kept in accurate transverse alignment at all times.

ALTERNATE ARRANGEMENT

For the single pair feed of articles as shown (two roll packages) the four cross bars 34 are spaced ten inches apart on the belt or chain loops 24, and the delivery belts 10 operate at a constant speed of about five inches per cycle. When four articles or rolls are to be wrapped in each package, alternate cross bars 34 are removed and the speed of the constantly operating delivery conveyors 10 is increased to slightly more than double or 12½ inches per cycle of the indexing conveyor. The drive ratio of the indexing drive 42 to the shaft 44 is doubled, so two pairs of rolls R are delivered each cycle to the wrapping conveyor.

FIG. 3 shows an alternative form of the accelerating mechanism. The change is essentially in the drive connections to the shaft 144, which corresponds to the shaft 44 in FIG. 1. The shaft 16 of the wrapping machine drives a reversing gear 117 which in turn drives a one position disengaging clutch 142. The clutch pawl 140 actuated by the solenoid 138 stops the clutch 142 at the end of a wrapping machine cycle when the sensing switch 46 senses an inadequate supply of in-coming articles on the supply conveyor.

Note that pawl 140 is angularly advanced somewhat relative to the rotation of clutch 142 and the corresponding position of pawl 40 in FIG. 1. The drive to the accelerating belts 18 and 20, and to the carrier loops 24 accordingly stops at the full line position 134D of one of the cross bars in FIG. 3, instead of 90° further around pulley 32 as in FIG. 1. Roll R-2 and the following rolls on conveyor 10 are accordingly stopped, as shown, a little further away from the intake "nip" of belts 18 and 22, and roll R-1 stops as shown, in the middle of the accelerator belts.

When this alternate form of the machine is restarted cross bar 134E permits advance of roll R-1 and delivery to the wrapping machine as in the first form of the invention in FIG. 1. Cross bar 134D must move 90° around pulley 32 (at relatively slow horizontal speed) before roll or article R-2 is picked up by the accelerating belts. The corresponding delay of the succeeding article creates sufficient gap for entry of the succeeding cross bar in the next cycle of the machine.

The intermittent drive 42 of the first forms of the invention is eliminated, and the indexing and feeding apparatus operates continuously so long as an adequate supply of articles R is present on belts 10.

What is claimed as new is:

1. In combination with a pair of side-by-side article delivery belts and a wrapping machine conveyor extending transversely across the delivery ends of said belts and in spaced relation to the ends thereof, article indexing and advancing mechanism comprising:
   upper and lower opposed accelerator belts positioned to receive pairs of articles from said delivery belts,
   a fixed dead plate positioned to support a pair of articles between the outlet ends of said accelerator belts and said wrapping machine conveyor,
   a pair of carrier loops positioned in upright planes along side of said accelerating belts and said dead plate,
   a plurality of transverse bars carried in equally spaced relation around said loops and advanced thereby into blocking positions between the delivery ends of said delivery belts and the receiving ends of said accelerator belts, and between said accelerator belts across said dead plate to article delivering position along side of said wrapping machine conveyor,
   and drive means including an intermittent cycling drive connected to be driven from said wrapping machine conveyor and to concurrently drive said accelerator belts and said carrier loops at equal linear speeds greater than the speed of said delivery belts,
   said intermittent cycling drive being arranged to provide a dwell and stop period with one of said cross bars in blocking relation in front of and closely adjacent the nip at the inlet ends of said accelerator belts.

2. The combination as defined in claim 1 in which another one of said cross bars is located over said dead plate and adjacent the receiving end thereof at the dwell and stop position of said carrier loops.

3. The combination as defined in claim 2 in which there are four of said cross bars carried by said carrier loops.

4. The combination as defined in claim 1 in which alternate ones of said cross bars are removable.

5. The combination as defined in claim 2 in which said intermittent drive is operative during 270° of the cycle of said wrapping machine and provides said dwell and stop period during the remaining 90° of the cycle of the wrapping machine.

6. The combination as defined in claim 5 in which said intermittent drive provides acceleration from said dwell and stop period and deceleration before the dwell and stop period.

7. The combination as defined in claim 2 in which said cycling drive includes a single position engaging and disengaging clutch connection to said wrapping machine corresponding to the dwell and stop position thereof.

8. In combination with a pair of side-by-side article delivery belts and a wrapping machine conveyor extending transversely across the delivery ends of said belts and in spaced relation to the ends thereof, article advancing mechanism comprising:
   upper and lower opposed accelerator belts positioned to receive pairs of articles from said delivery belts,
   a fixed dead plate positioned to support a pair of articles between the outlet ends of said accelerator belts and said wrapping machine conveyor,
   a pair of carrier loops positioned in upright planes along side of said accelerator belts and said dead plate,
   a plurality of transverse bars carried in equally spaced relation around said loops and advanced thereby into blocking positions between the delivery ends of said delivery belts and the receiving ends of said accelerator belts, and between said accelerator belts across said dead plate to article delivering position along side of said wrapping machine conveyor,
   and drive means including a clutch connected to be driven from said wrapping machine conveyor and to concurrently drive said accelerator belts and said carrier loops at equal linear speeds greater than the speed of said delivery belts,
   said clutch being arranged to stop said drive means at one position in the cycle of said wrapping machine conveyor with one of said cross bars in blocking relation in front of the inlet ends of said accelerator belts.

9. The combination as defined in claim 8 which further includes an article sensing switch connected to control said clutch and positioned to sense the absence of articles at the delivery end of said delivery belts.

10. The combination as defined in claim 9 in which said carrier loops pass around pulleys to direct said transverse bars down ahead of articles on said delivery belts and then arcuately forwardly,
   said clutch being arranged to stop said loops with a transverse bar adjacent the start of its arcuate motion as directed by said pulleys.

11. The combination as defined in claim 9 in which said carrier loops pass around pulleys to direct said transverse bars down ahead of articles on said delivery belts and then arcuately forwardly,
   said clutch being arranged to stop said loops with a transverse bar adjacent the end of its arcuate motion as directed by said pulleys.

12. The combination as defined in claim 9 in which said carrier loops pass around pulleys to direct said transverse bars down ahead of articles on said delivery belts and then arcuately forwardly,
   said clutch being arranged to stop said loops with a transverse bar adjacent the end of its arcuate motion as directed by said pulleys,
   and an intermittent drive connected in said drive means and arranged to provide a dwell and stop period at the stop position of said clutch.

13. The combination as defined in claim 10 in which said drive means opperates continuously with said wrapping machine when said clutch is engaged.

* * * * *